(12) United States Patent
Gangadharaiah et al.

(10) Patent No.: US 10,860,629 B1
(45) Date of Patent: Dec. 8, 2020

(54) TASK-ORIENTED DIALOG SYSTEMS UTILIZING COMBINED SUPERVISED AND REINFORCEMENT LEARNING

(71) Applicant: Amazon Technologies, Inc., Seattle, WA (US)

(72) Inventors: Rashmi Gangadharaiah, San Jose, CA (US); Balakrishnan Narayanaswamy, San Jose, CA (US); Charles Elkan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/943,287

(22) Filed: Apr. 2, 2018

(51) Int. Cl.
*G06F 16/332* (2019.01)
*H04L 12/58* (2006.01)
*G06N 20/00* (2019.01)
*G06F 16/33* (2019.01)

(52) U.S. Cl.
CPC ...... *G06F 16/3329* (2019.01); *G06F 16/3347* (2019.01); *G06N 20/00* (2019.01); *H04L 51/02* (2013.01)

(58) Field of Classification Search
None
See application file for complete search history.

(56) References Cited

U.S. PATENT DOCUMENTS

| 2009/0245500 | A1* | 10/2009 | Wampler | H04M 3/42382 |
| | | | | 379/265.09 |
| 2018/0013699 | A1* | 1/2018 | Sapoznik | G06F 40/216 |
| 2018/0060301 | A1* | 3/2018 | Li | G06F 17/2775 |
| 2018/0253640 | A1* | 9/2018 | Goudarzi | G06N 3/0454 |
| 2019/0109803 | A1* | 4/2019 | Akkiraju | G09B 19/00 |

\* cited by examiner

*Primary Examiner* — Antim G Shah
(74) *Attorney, Agent, or Firm* — Nicholson De Vos Webster & Elliott, LLP

(57) ABSTRACT

Techniques for intelligent task-oriented multi-turn dialog system automation are described. A seq2seq ML model can be trained using a corpus of training data and a loss function that is based at least in part on a distance to a goal. The seq2seq ML model can be provided a user utterance as an input, and a vector of a plurality of values output by a plurality of hidden units of a decoder of the seq2seq ML model can be used to select one or more candidate responses to the user utterance via a nearest neighbor algorithm. In some embodiments, the specially adapted seq2seq ML model can be trained using unsupervised learning, and can be adapted to select intelligent, coherent agent responses that move a task-oriented dialog toward its completion.

18 Claims, 11 Drawing Sheets

TASK-ORIENTED DIALOG SYSTEMS UTILIZING COMBINED SUPERVISED AND REINFORCEMENT LEARNING

BACKGROUND

Conversational agents have been suggested and utilized for many domain-specific commercial applications. Some of these applications are task-oriented, in that they aim to help users/customers achieve a specific goal, such as making an airline or hotel reservation. To achieve this goal, an agent must extract relevant information from the user (e.g., preferences), provide relevant knowledge to her (e.g., prices and availability), issue appropriate system calls (e.g. make a payment), and effectively complete the task.

With recent advances in speech recognition, chatbots are now omni-present, reaching many people through speech-based services (e.g., smart home speakers, computer or mobile device applications, etc.). Much work has been done recently for chit-chat in open domain contexts. The term "chit-chat" refers to systems that have the ability to generate fluent responses to questions or other utterances that are reasonable in the context of the conversation, in contrast to task-oriented settings discussed above that seek to conduct or guide a conversation to complete a particular task.

BRIEF DESCRIPTION OF DRAWINGS

Various embodiments in accordance with the present disclosure will be described with reference to the drawings, in which.

DETAILED DESCRIPTION

Figure 1:
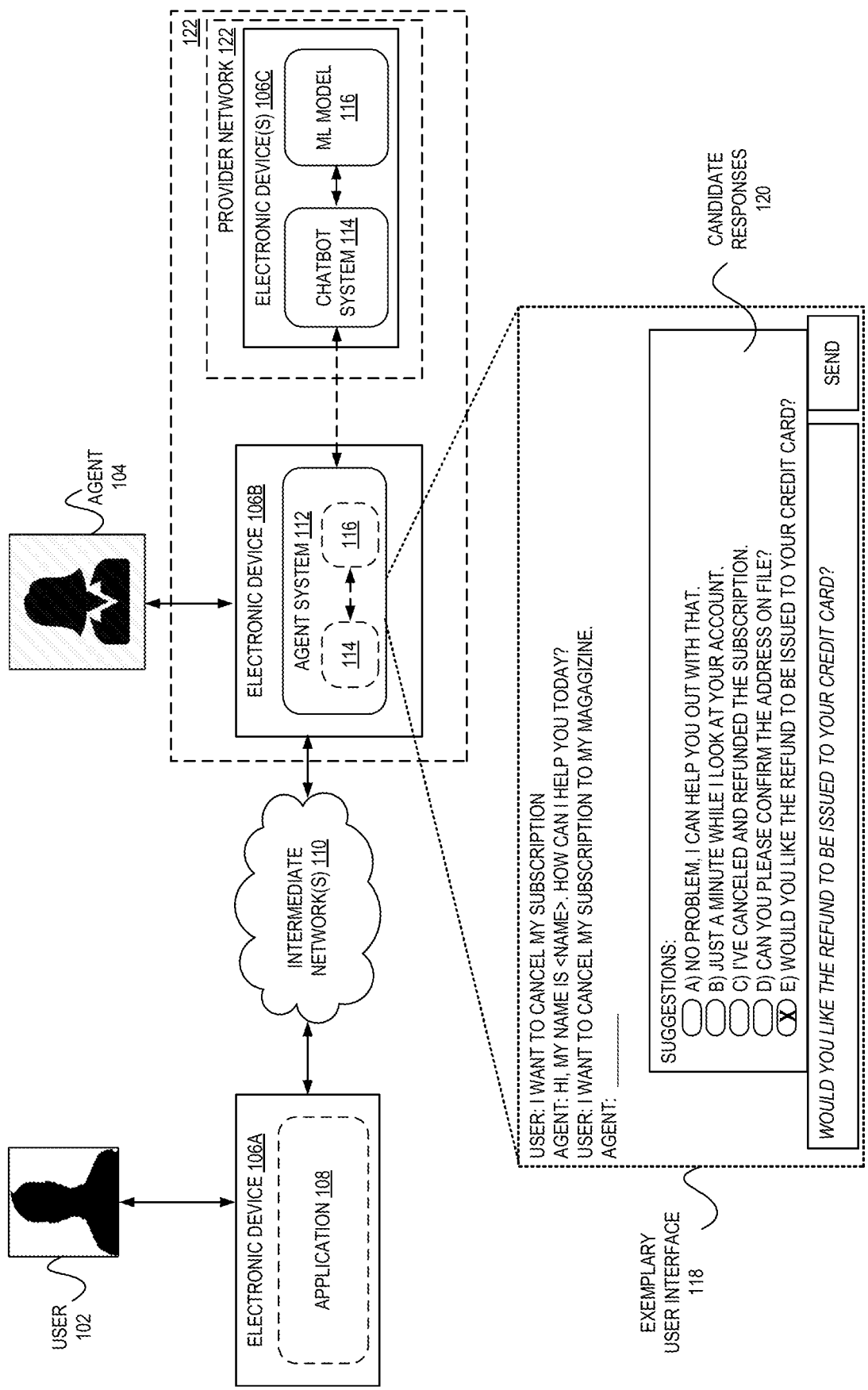
FIG. 1 is a diagram illustrating an environment for multi-turn task-based dialog using goal-oriented models according to some embodiments.

Various embodiments of methods, apparatus, systems, and non-transitory computer-readable storage media for intelligent task-oriented multi-turn dialog systems are described. According to some embodiments, a machine learning (ML) model (such as a sequence to sequence (seq2seq) model) can be trained using a corpus of training data (e.g., prior multi-turn task-oriented chat dialogs) and a loss function that is based at least in part on a distance to a goal. The ML model can be provided a user utterance as an input, and output from the ML model—e.g., a vector of a plurality of values output by a plurality of hidden units of a decoder of a seq2seq ML model—can be used to select one or more candidate responses to the user utterance (e.g., via a nearest neighbor algorithm). In some embodiments, the specially-adapted ML model can be trained using unsupervised learning, and can be adapted to select intelligent, coherent agent responses that move a task-oriented dialog toward its completion.

Large-domain task-oriented dialog systems, in which agents may need to simultaneously generate fluent natural language responses, and possibly perform other external actions such as making database queries and updates, are an important desired type of system with wide-ranging uses. Some approaches to implementing such types of systems could use, for example, reinforcement learning (RL) or supervised learning (SL) approaches.

RL refers to a class of techniques that allow machines to learn sequential decision making from sparse and distant reward. In RL approaches to dialog, a policy is learned online via interactions with users who provide feedback. RL has the advantage that it learns models that optimize the appropriate long-term reward, in this case, fast and accurate completion of the user's task. However, RL approaches usually require separate Natural Language Understanding (NLU) and Generation (NLG) components that are tuned separately to generate states, and also typically use pre-defined templates with slots and values to specify actions. Thus, the state space, the action space, and the rewards need to be carefully defined, requiring expensive human annotations or domain knowledge. Requiring domain-specific knowledge as rules or templates limits the expressive power of the models as the responses must belong to the pre-defined sets of possible responses, making the deployment of such systems difficult in the real world.

In contrast, SL approaches learn dialog policies offline from examples of expert trajectories. Such approaches are attractive since the dialog policy is learned with minimal or no human supervision. However, SL approaches require many example dialogs to achieve acceptable levels of performance. Such a trade-off may be reasonable in some dialog applications, such as customer support and service, where a large number of examples generated by skilled human agents may exist.

A significant disadvantage with SL is the fact that they do not optimize for future rewards. That is, they learn to match each utterance in a training dialog, using a loss function like the cross-entropy between predicted word distributions and true agent utterances, but do not consider the task, dialog history, and final goal. This is particularly important given the sequential and repeated interactions in dialog systems. A major shortcoming of the cross-entropy loss is that it heavily penalizes small changes in the ordering or choice of words, even when sentences are semantically similar. Thus, different responses that all may be valid given the context of the conversation, may have a large distance in terms of cross entropy loss.

Embodiments disclosed herein can utilize aspects of both SL and RL type approaches to implement highly-accurate task-oriented dialog systems. Embodiments can provide additional rewards at every turn of the dialog, that depend on the final goal state. Embodiments can use SL type techniques to learn embeddings (or real valued representations) of dialog history, at each turn of the dialog, offline without the need for additional human annotation. Embodiments can add a reward term to the negative cross entropy at each turn that measures the deviation of the predicted next state learned embedding from the final state embedding for that dialog. The final embedding may capture information about the goal API call that was issued by the agent (or other ending event/state), and information extracted from the customer in the course of the dialog. This additional reward term encourages agent responses that semantically move the conversation in the right direction in the latent space, and de-emphasizes the cross-entropy loss. Notably, this does not mean that the dialog agent has unfair look-ahead into the final customer goal, but that the RL rewards are shaped during training to encourage useful behavior.

Seq2Seq (or "sequence to sequence") models or encoder-decoder architectures are an application of the well-known Long Short-Term Memory (LSTM) architecture, to tasks where input and output sequences are of variable length. Seq2Seq models are end-to-end trainable and do not require annotating actions or intents. Typically, seq2seq models have been known to produce repetitive and ungrammatical responses. However, embodiments disclosed herein combine nearest neighbor techniques with Seq2Seq methods to generate coherent and fluent responses—e.g., by using nearest neighbor algorithms in the learned embedding state to generate agent responses.

Accordingly, embodiments disclosed herein utilize a custom variant of a Seq2Seq model designed to handle multi-turn dialogs that can generate succinct continuous representations of states and actions. Moreover, in some embodiments, a goal state can be explicitly tracked and utilized to allow a chat to be efficiently steered toward a goal.

FIG. 1 is a diagram illustrating an environment for multi-turn task-based dialog using goal-oriented models according to some embodiments. In this environment, a user 102 (or customer) may utilize an application 108 (e.g., a web browser running client-side code, a special-purpose application, etc.) allowing the user 102 to participate in a task-oriented dialog with an agent 104 (e.g., a person or automaton acting on behalf of an organization such as a business, government, non-profit, or other group), typically across one or more intermediate networks 110 such as the internet. For example, the application 108 may provide a graphical user interface (GUI), voice interface, etc., that allows the user 102 to provide/input (e.g., via a keyboard, mouse, voice commands, etc.) an utterance (e.g., a message such as a statement or question) that is part of the dialog. The application 108 may similarly provide, to the user 102 via a GUI or audio output (e.g., a speaker) or another interface, messages provided by the agent 104 as part of the task-based dialog.

To participate in the task-oriented dialog, an agent 104 may utilize an agent system 112 (e.g., a web browser running client-side code, a special-purpose application, etc.) that similarly provides the agent 104 with utterances made by the user 102, allows the agent 104 to select, edit, or generate response messages, and/or allows the agent 104 to perform actions associated with the task, such as canceling an order, inputting/updating user information (e.g., user biographical and/or account information, order information, notes, etc.). For example, the agent system 112 may provide the agent 104 a user interface 118 with one or more candidate responses 120 (that are deemed as being responsive to a user utterance in the context of the dialog) generated by a chatbot system 114 via a machine learning (ML) model 116, in which the agent 104 could select a candidate response to be used as an actual response (and thus provided to the user 102 as an agent 104 utterance), select and edit a candidate response, or ignore the candidate response(s) and instead provide a separate utterance.

In some embodiments, the chatbot system 114 can be implemented using software, hardware, or a combination of both, by one or more electronic device(s) 106C, which may be implemented within a provider network (e.g., as a service). The chatbot system 114 may utilize a ML model 116 as described herein, which also may be implemented within a provider network, and could be part of the chatbot system 114 itself (not shown) or separately implemented (as shown, perhaps by a machine learning service described later herein) and accessed by the chatbot system 114. Alternatively or additionally, in some embodiments, aspects or the entirety of the chatbot system 114 and/or ML model 116 could be implemented within (or along with) the agent system 112 on a same electronic device 106B (e.g., as software components).

Thus, the agent 104 in this system plays an intermediary role between the user 102 and the chatbot system 114. This can be done to ensure customer satisfaction, to allow an agent 104 to fine-tune and control the content and/or flow of the dialog to provide a good user experience, though in some embodiments the chatbot system 114 could act as an agent on its own (i.e., without the need for an intermediary). In some embodiments, though, the chatbot system 114 could begin a dialog with a user 102 on its own, and perhaps request (or assign) an agent 104 to join the dialog if needed (e.g., if the dialog is not progressing toward completion, if user dissatisfaction is detected via a tone of utterances or content of the utterances, etc.)

In some embodiments, the user 102 initiates a dialog by entering a query. At every turn of the dialog, the chatbot system 114 may generate one or more candidate responses (e.g., one response, five diverse responses, etc.) given the dialog history. The agent 104 can then select or modify one of these responses, or type a completely different response if the responses are unsatisfactory. In some embodiments, the chatbot system 114 uses nearest neighbor-based techniques to retrieve agent responses corresponding to the most similar dialog state from the training data. To identify similar dialog states, embodiments create and use an embedding (or representation) of dialog history in a space where Euclidean distances can be used.

Figure 2:
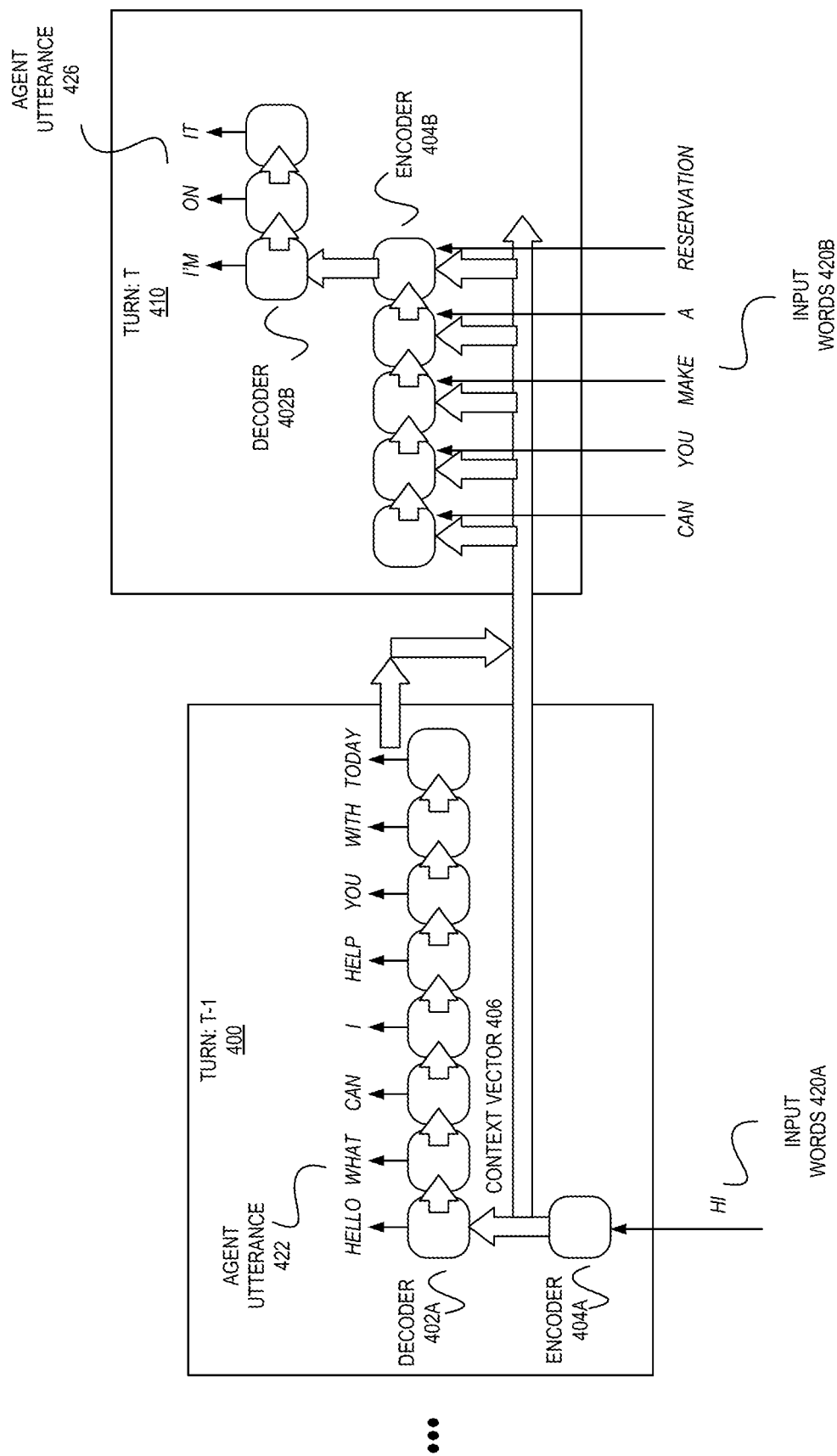
FIG. 2 is a diagram illustrating training of a multi-turn goal-oriented sequence-to-sequence (seq2seq) model according to some embodiments.
Figure 3:
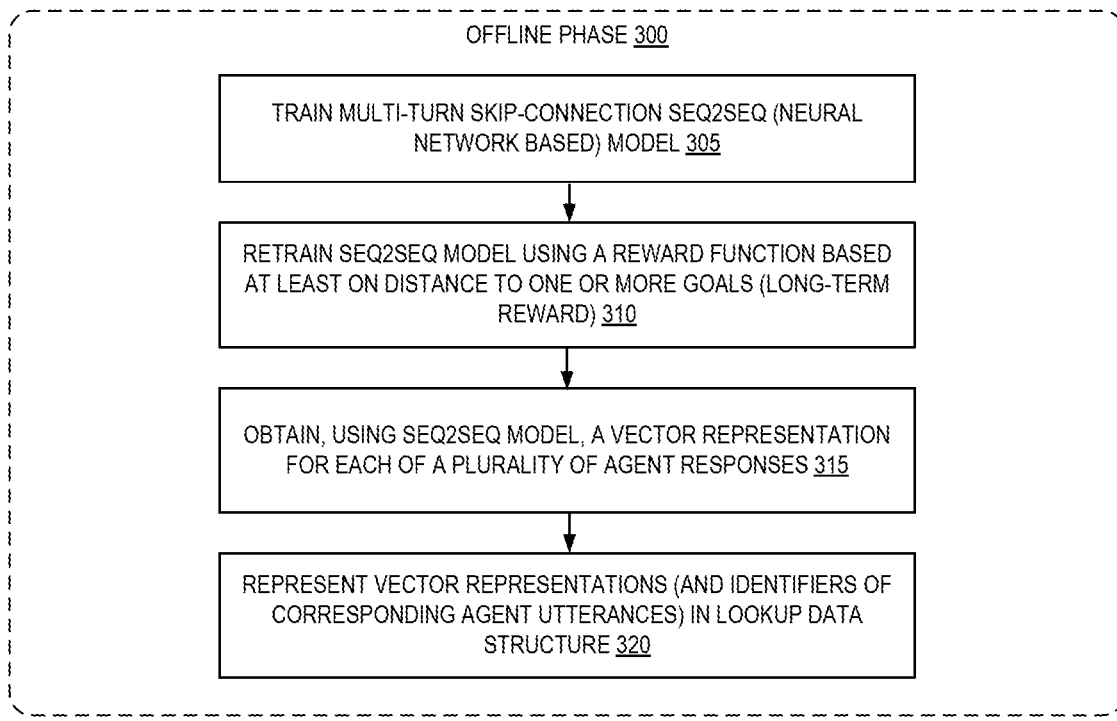
FIG. 3 is a diagram illustrating exemplary operations of an offline phase for implementing a multi-turn task-based dialog system using a goal-oriented model according to some embodiments.

To generate such embeddings, embodiments utilize a multi-turn skip-connection network (ML model 116) or a variant thereof. For example, FIG. 2 is a diagram illustrating aspects of training of a multi-turn goal-oriented sequence-to-sequence (seq2seq) model according to some embodiments. Such training of a ML model can be part of an overall "offline" phase 300 used in some embodiments that is represented in FIG. 3, which is a diagram illustrating exemplary operations of an offline phase for implementing a multi-turn task-based dialog system using a goal-oriented model according to some embodiments.

The offline phase 300 is shown as including block 305, where a multi-turn skip-connection seq2seq model is trained. Turning back to FIG. 2, a skip-connection architecture is shown that extends a "plain" Seq2Seq model to the multi-turn setting. Seq2Seq models include of parameter-tied replicas of 2 base Long Short-Term Memory (LSTM) layers. One set encodes the input sequence, and the second decodes an output sequence. Each LSTM cell learns the transition function for memory, inputs, and outputs. The entire model is trained end-to-end to maximize a specific reward function.

LSTM units (or blocks) are typically a building unit for layers of a recurrent neural network (RNN). A RNN composed of LSTM units is often called an LSTM network. A common LSTM unit is composed of a cell (that "remembers" values over a time period), an input gate, an output gate and a forget gate. Each of the three gates can be thought of as a "conventional" artificial neuron, as in a multi-layer (or feedforward) neural network—i.e., they compute an activation (using an activation function) of a weighted sum. Intuitively, they can be thought as regulators of the flow of values that move through the connections of the LSTM. There are connections between these gates and the cell.

In some embodiments, a Seq2Seq model is "unrolled" to make one copy for each turn 400/410 in the dialog. Each of the Seq2Seq copies share the same LSTM parameters. In FIG. 2, the square cells/boxes (associated with encoder 404A/404B) represent the LSTM cells of the encoder. The square cells in the decoder (e.g., decoder 402A/402B) represent the LSTM and dense layers. The broad arrows represent the flow of information from one cell to another and arrows forking represent copies of this information. In some embodiments input words 420A/420B are one-hot encoded, and projected using a linear layer to obtain $x_k^t$ from the raw input word at position k in turn t.

A turn is thus converted into a sequence of inputs represented by $X_t = \{x_1^t, x_2^t, \ldots, x_L^t\}$. The output sequence to be generated is represented by $Y_t = \{y_1^t, y_2^t, \ldots, y_L^t\}$. The encoder at turn t receives the user's (projected) input at t, as well as the context vectors from the final hidden units of the encoder ($h_{enc}^{t-1}$) and the decoder ($h_{enc}^{t-1}$) at turn t−1, forming a skip connection.

The total reward $R(h_{dec}^{1:T}, y^{1:T}) = \sum_{t=1}^{T} R^t(h_{dec}^t, y^t)$ where $R^t$ is the per-turn reward and T is the maximum number of turns in a dialog. In some embodiments, the reward used in the base model is the negative of the cross-entropy loss, as shown in Equation 1:

$$R^t(h_{dec}^t, y^t) = \sum_{i=1}^{L} \sum_{j=1}^{V} [y_{i,j}^t \log \hat{y}_{i,j}(h_{dec}^t) + (1 - y_{i,j}^t) \log(1 - \hat{y}_{i,j}(h_{dec}^t))] \quad \text{(Eq. 1)}$$

where V is the size of the vocabulary, $y_{i,j}^t$ is the jth entry of the one hot encoding of the ith word in the true agent utterance, and $\hat{y}_{i,j}(h_{dec}^t)$ are the probabilities generated by the softmax layer. The neural network weights are trained end-to-end to maximize this reward. Once the training is complete, embodiments use only one copy of the Seq2Seq model, which encodes the dialog history and generates the next agent utterance.

The categorical cross entropy loss penalizes small shifts and semantically equivalent reformulations and so embodiments provide rewards in the embedding space of the goal. Thus, embodiments can learn embeddings that are better representations of dialog and language semantics, as neural networks can be used to learn semantically meaningful embeddings of words and sentences.

In some embodiments, embeddings are learned for dialogs using a two-phase process. The first part learns a continuous representation of the goal state using the negative cross entropy reward, and the second phase re-trains the network to maximize a weighted sum of both the negative cross entropy and negative distance to the final goal. This configuration encourages the model to learn representations of dialog that are good predictors of the future.

Phase 1: Learning Embeddings of the Goal State.

The skip-connection model for handling multi-turn dialog can be trained as described above with regard to FIG. 2. The output of the last hidden unit of the encoder and the decoder at the last turn T of a training dialog are used to represent the goal state, although in other embodiments other approaches known to those of skill in the art can also be used to obtain a representation for the final agent's response, provided that those approaches would be extended to consider the dialog context.

Phase 2: Re-Training the Network.

In the second phase, the neural network is re-trained with an additional reward term—e.g., the weighted negative of the squared Euclidean distance between the predicted responses and the goal vector in the latent space. Formally, Equation 1 can be modified to define a new reward $\hat{R}$ as shown in Equation 2:

$$\hat{R}(z^t, y^t) = R^t(h_{dec}^t, y^t) - \lambda(z^t - z^T)^2 \quad \text{(Eq. 2)},$$

where $z^t = [h_{dec}^t, h_{dec}^t]$. $z^T = [h_{dec}^T, h_{dec}^T]$ is the latent space embedding at the end of entire training dialog (i.e., the final state) obtained in Phase 1.

This second phase can be part of block 310 in FIG. 3, which includes retraining the seq2seq model using a reward function based on a distance to at least one goal (and optionally, also based on cross entropy loss).

Using the re-trained network, embodiments can utilize a nearest-neighbor based approach to determine one or more "best" possible responses to be made by an agent using the re-trained network. This can be part of blocks 315 and 320 of FIG. 3, which include obtaining, using the seq2seq model, a vector representation for each of a plurality of agent responses (e.g., from the training corpus) at block 315, and representing the vector representations and corresponding agent utterances in a lookup data structure at block 320.

For example, in embodiments using a nearest neighbor based approach, the chatbot system's response is chosen from the training data corpus (e.g., from human-generated transcripts of dialogs) to ensure that the candidate responses are valid, conversational, fluent utterances. To ensure that the responses are coherent, embodiments use the embedding vector obtained from the entire history of the dialog so far.

Accordingly, with the final re-trained model, embodiments use the outputs of the hidden units in the decoders and encoders as representations of dialog history. Each agent utterance is represented by a tuple, $\langle bs_{t,i}, a_{t,i} \rangle$ where $bs_{t,i}$ represents the dialog state at turn t for dialog example i and $a_{t,i}$ represents the action the agent took while in this state, i.e., the natural language response or API call query issued by the agent. In some embodiments, $bs_{t,i}$ is formed by concatenating $h_{dec}^{t-1}$ from turn t−1, and $h_{enc}^t$ from turn t. Embodiments collect the embeddings for all the agent responses in the training data into a set S, which can be represented in a lookup data structure (e.g., a ball tree) where each embedding can identify or be associated with the corresponding agent response.

Figure 4:
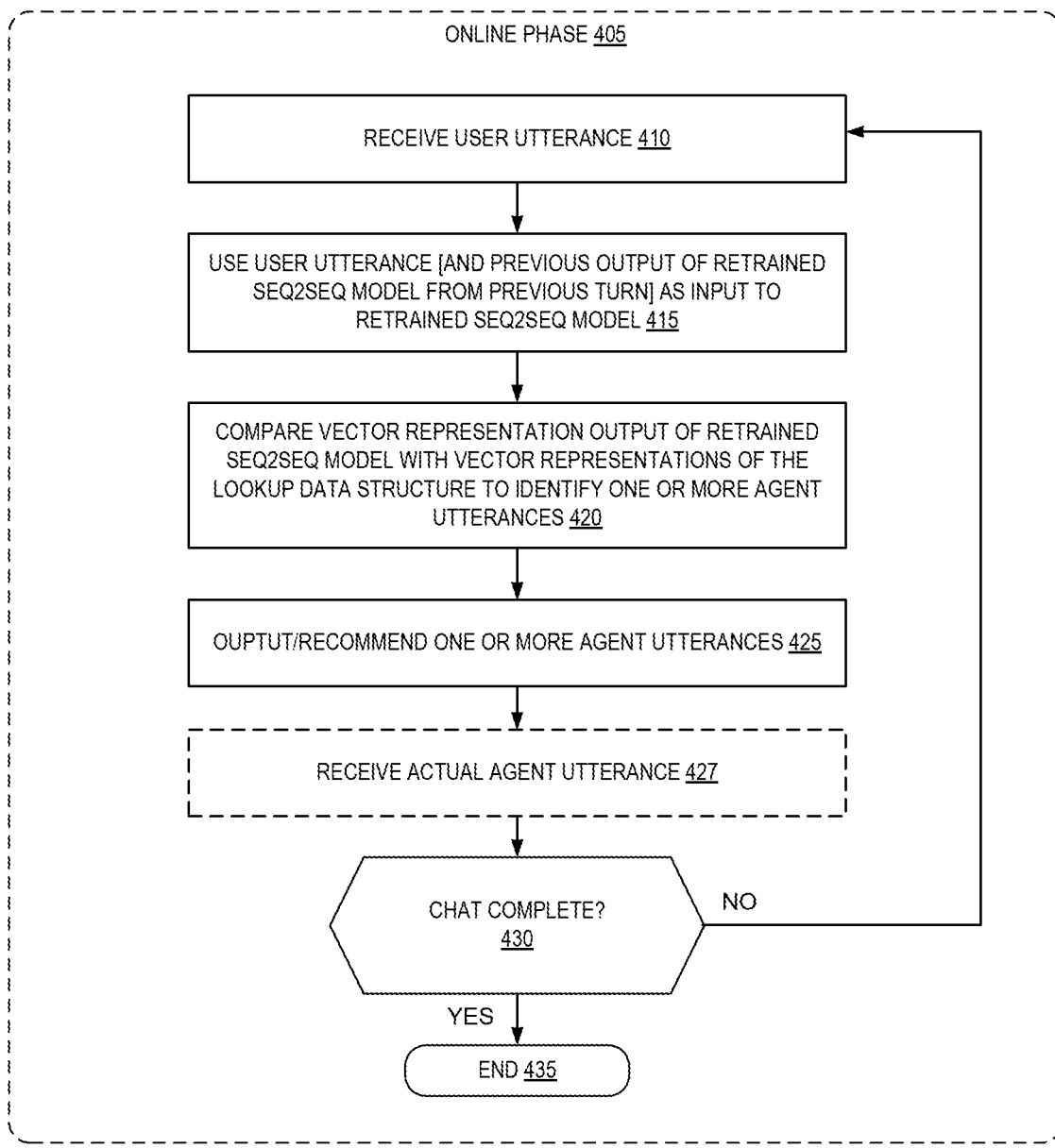
FIG. 4 is a diagram illustrating exemplary operations of an online phase for implementing a multi-turn task-based dialog system using a goal-oriented model according to some embodiments.

At this point, the chatbot system 114 and ML model 116 can be utilized in an "online" phase 400 during a dialog as represented by FIG. 4, which is a diagram illustrating exemplary operations of an online phase for implementing a multi-turn task-based dialog system using a goal-oriented model according to some embodiments. The online phase 400 includes, as part of a dialog, receiving a user utterance at block 410, and using the user utterance (and any previous output of the retrained seq2seq model from the previous turn) as an input to the retrained seq2seq model at block 415. At block 420, the vector representation that is outputted by the retrained seq2seq model can be compared with vector representations of the lookup data structure to identify one more agent utterances (that again, were from the original training corpus), which can be presented to the agent (to select/verify an agent response) or directly sent to the user (as the agent response) at block 425. Optionally, at block 427, in some embodiments the ultimately selected agent utterance (from a set of candidate utterances) or edited utterance or agent-composed utterance (which may not even be based on any recommended utterance) is provided back to the chatbot system 114 for use in later online phase analysis). If it is determined that the chat is not complete at block 430, the flow may continue again upon receipt of a next user utterance at block 410, et seq., and at some point the process ends at block 435.

Accordingly, in some embodiments to generate an agent's response at turn t, the output of the last hidden unit of the decoder at turn t−1 and the output of the last hidden unit of the encoder at turn t, i.e., testVec=[$h_{dec}^{t-i}$, $h_{enc}^{t}$], are used to find the nearest neighbor, $bs_j$, from S. Embodiments thereafter return the corresponding agent response, $a_j$, as the agent's response for the active dialog. Embodiments use a lookup data structure (e.g., ball trees) to perform an efficient nearest neighbor search. For human-in-the-loop environments, embodiments provide more flexibility to a human agent in choosing the most appropriate response by, for example, finding more than one agent response (e.g., the k=100 nearest neighbor agent responses). In some embodiments, a large number of responses can be identified (e.g., 100) and then the chatbot system 114 can use a ranking approach (e.g., diversity-based ranking) to return a number (e.g., five) of diverse responses. To construct an adjacency matrix for diversity ranking, embodiments use the word overlap between responses after stop word removal.

Accordingly, embodiments can provide appropriate and fluent agent responses in a multi-turn task-based dialog. Moreover, embodiments can provide agent responses that mimic certain interesting human agent behaviors, at appropriate points in the conversation. For example, a chatbot may be surprised to know that the user also shares the same name, and respond with an appropriate surprised response. Additionally, the chatbot system may 'detect' that the user is not happy or is frustrated, and could respond with appropriate responses (gleaned from actual human agent responses in similar scenarios) such as smileys/emoji, and perhaps even make an exception on the return policy to satisfy an upset customer. Accordingly, such behavior indicates that the learned embeddings are able to capture features of meaning and sentiment, and choose appropriate responses. Thus, embodiments can improve chatbot performance in such multi-turn task-oriented dialogs via the learning of embeddings and tracking how these approached final/end goals during the course of a dialog. Moreover, embodiments can use historical dialogs while the representation learning of state and action spaces can beneficially be completely unsupervised, and thus, embodiments do not require hand labeled data such as slots, intents, and values as is done in traditional RL for dialog systems.

Figure 5A:
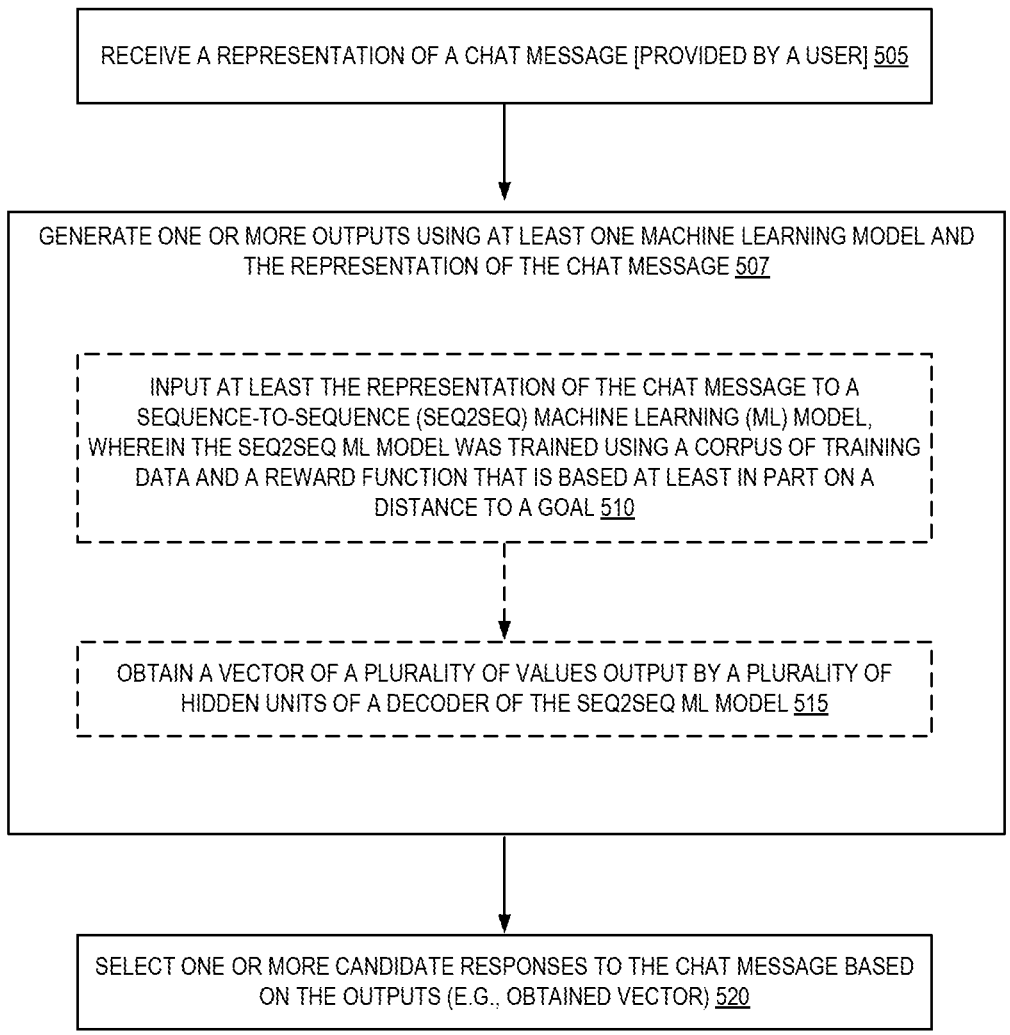
FIG. 5A is a flow diagram illustrating exemplary operations of a method for generating candidate responses in a multi-turn task-based dialog using a goal-oriented model according to some embodiments.

FIG. 5A is a flow diagram illustrating exemplary operations of a method for generating candidate responses in a multi-turn task-based dialog using a goal-oriented model according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by the chatbot system 114 (and/or ML model 116) of the other figures.

The operations 500 include, at block 505, receiving a representation of a chat message. The representation may be text formatted, and may have been provided by a user as text or another format (e.g., audio, and then converted into text), and may have been submitted as part of a task-oriented chat dialog.

The operations 500 also include, at block 507, generating one or more outputs using at least a machine learning (ML) model at the representation of the chat message. For example, block 507 in some embodiments includes block 510, and inputting at least the representation of the chat message to a sequence-to-sequence (seq2seq) ML model, wherein the seq2seq ML model was trained using a corpus of training data and a reward function that is based at least in part on a distance to a goal. In some embodiments, the seq2seq ML model was originally trained using a reward function not related to a distance to a goal (e.g., using cross-entropy loss) but then is re-trained using a reward function based on distance to a goal (e.g., using both cross-entropy loss as well as distance to a final goal—e.g., a final utterance in a conversation, a satisfied user, etc.). Thus, in some embodiments, the seq2seq ML model comprises an initial seq2seq ML model that was re-trained to maximize a weighted sum of a negative cross entropy and a negative distance to a goal. In some embodiments, the reward function is further based on cross entropy.

In some embodiments, block 507 includes, at block 515, obtaining a vector of a plurality of values output by a plurality of hidden units of a decoder of the seq2seq ML model.

At block 520, the operations 500 include selecting one or more candidate responses to the chat message based on the obtained vector. In some embodiments, the one or more candidate responses exist in the corpus of training data. In some embodiments, selecting the one or more candidate responses comprises performing a nearest neighbor search using the obtained vector (e.g., from block 515) to identify one or more other vectors, the one or more other vectors corresponding to one or more agent utterances from the corpus of training data; and selecting, as the one or more candidate responses, the one or more agent utterances. In some embodiments, selecting the one or more agent utterances comprises selecting a plurality of agent utterances as the one or more candidate responses.

In some embodiments, the operations 500 further include causing the selected one or more candidate responses to be presented via a graphical user interface (GUI) to another user acting as an agent, wherein the one or more candidate responses are selectable by the agent as a response to be sent to an electronic device of the user as part of a user-agent chat dialog. In some embodiments, the selected one or more candidate responses comprise a plurality of candidate responses that are presented via the GUI to the another user.

In some embodiments, the operations 500 further include causing one of the selected one or more candidate responses to be sent to an electronic device of the user.

In some embodiments, the chat message is received as part of a multi-turn dialog between the user and an agent, and the chat message is a second or later chat message made by the user within the multi-turn dialog, and the one or more candidate responses are selected based at least in part on the representation of the chat message, a representation of a previous utterance made by the user within the multi-turn dialog, and a representation of a previous response made by the agent in the multi-turn dialog.

In some embodiments, one or more of the chatbot system 114, ML model 116, and/or agent system 112 are implemented in a provider network (e.g., as software components). A provider network provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage), network-related resources (e.g., configuring virtual networks including groups of compute resources, content delivery networks (CDNs), Domain Name Service (DNS)), application resources (e.g., databases, application build/deployment services), etc. These and other computing resources may be provided as services, such as a hardware virtualization service that can execute compute instances, a storage virtualization service that can store data objects, etc. The users (or "customers") of provider networks may utilize one or more user accounts that are associated with a customer account, though these terms may be used somewhat interchangeably depending upon the context of use. Users may interact with a provider network across one or more intermediate networks 110 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

Figure 5B:
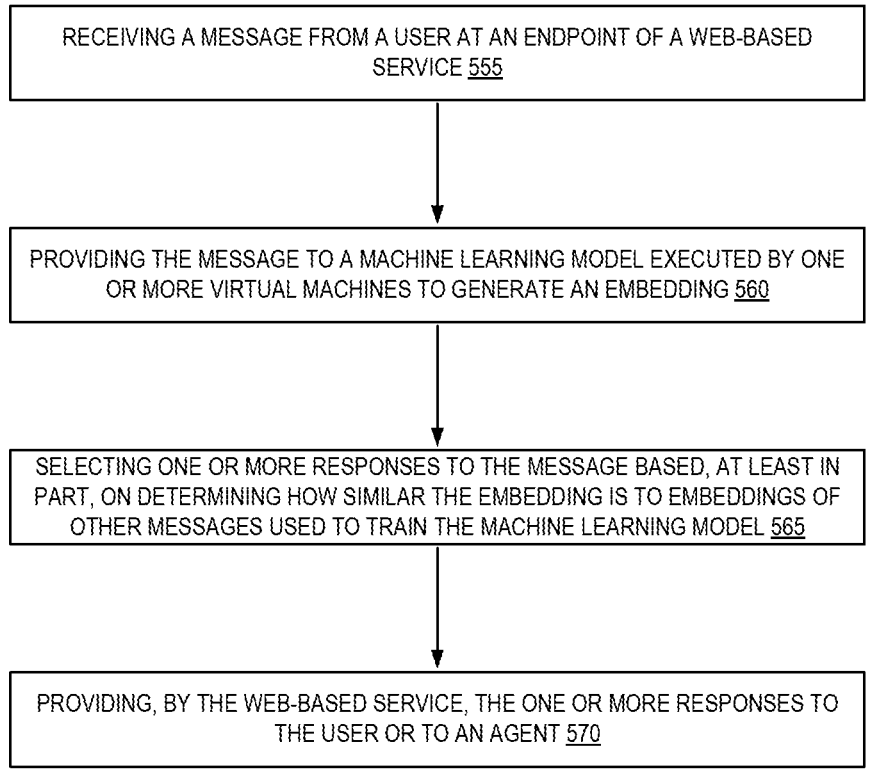
FIG. 5B is a flow diagram illustrating another set of exemplary operations of a method for generating candidate responses in a multi-turn task-based dialog using a goal-oriented model according to some embodiments.

FIG. 5B is a flow diagram illustrating additional exemplary operations of a method for generating candidate responses in a multi-turn task-based dialog using a goal-oriented model according to some embodiments. Some or all of the operations 550 are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 550 are performed by the chatbot system 114 (and/or ML model 116) of the other figures.

The operations 550 include, at block 555, receiving a message from a user at an endpoint of a web-based service. The operations 550 include, at block 560, providing the message to a machine learning model executed by one or more virtual machines to generate an embedding. The operations 550 include, at block 565, selecting one or more responses to the message based, at least in part, on determining how similar the embedding is to embeddings of other messages used to train the machine learning model. The operations 550 include, at block 570, providing, by the web-based service, the one or more responses to the user or to an agent.

In some embodiments the ML model(s) 116 of the earlier figures may be trained and/or run by a model hosting system 640, which may be part of a provider network 600.

Figure 6:
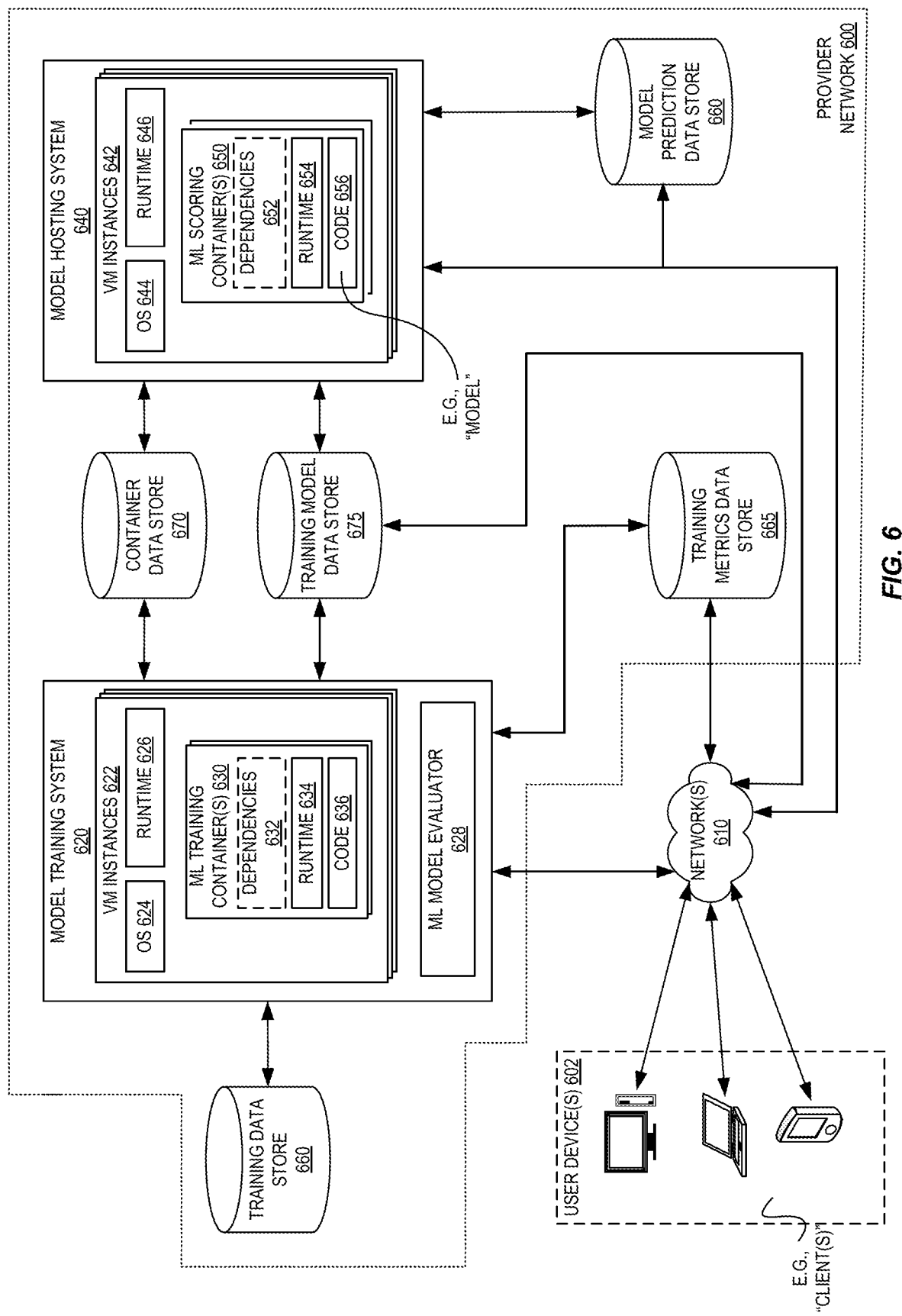
FIG. 6 is a block diagram of an illustrative operating environment in which machine learning models are trained and hosted according to some embodiments.

FIG. 6 is a block diagram of an illustrative operating environment in which machine learning models are trained and hosted according to some embodiments. The operating environment includes end user devices 602, a model training system 620, a model hosting system 640, a training data store 660, a training metrics data store 665, a container data store 670, a training model data store 675, and a model prediction data store 680.

A machine learning service described herein may include one or more of these entities, such as the model hosting system 640, model training system 620, etc.

In some embodiments, users, by way of user devices 602, interact with the model training system 620 to provide data that causes the model training system 620 to train one or more machine learning models. A machine learning model, generally, may be thought of as one or more equations that are "trained" using a set of data. In some embodiments, the model training system 620 provides ML functionalities as a Web service, and thus messaging between user devices 602 and the model training system 620 (or provider network 600), and/or between components of the model training system 620 (or provider network 600), may utilize HTTP messages to transfer data in a machine-readable file format, such as eXtensible Markup Language (XML) or JavaScript Object Notation (JSON).

The user devices 602 can interact with the model training system 620 via frontend 629 of the model training system 620. For example, a user device 602 can provide a training request to the frontend 629 that includes a container image (or multiple container images, or an identifier of one or multiple locations where container images are stored), an indicator of input data (e.g., an address or location of input data), one or more hyperparameter values (e.g., values indicating how the algorithm will operate, how many algorithms to run in parallel, how many clusters into which to separate data, etc.), and/or information describing the computing machine on which to train a machine learning model (e.g., a graphical processing unit (GPU) instance type, a central processing unit (CPU) instance type, an amount of memory to allocate, a type of virtual machine instance to use for training, etc.).

In some embodiments, the container image can include one or more layers, where each layer represents an executable instruction. Some or all of the executable instructions together represent an algorithm that defines a machine learning model. The executable instructions (e.g., the algorithm) can be written in any programming language (e.g., Python, Ruby, C++, Java, etc.). In some embodiments, the algorithm is pre-generated and obtained by a user, via the user device 602, from an algorithm repository (e.g., a network-accessible marketplace, a data store provided by a machine learning training service, etc.). In some embodiments, the algorithm is completely user-generated or partially user-generated (e.g., user-provided code modifies or configures existing algorithmic code).

In some embodiments, instead of providing a container image (or identifier thereof) in the training request, the user device 602 may provide, in the training request, an algorithm written in any programming language. The model training system 620 then packages the algorithm into a container (optionally with other code, such as a "base" ML algorithm supplemented with user-provided code) that is eventually loaded into a virtual machine instance 622 for training a machine learning model, as described in greater detail below. For example, a user, via a user device 602, may develop an algorithm/code using an application (e.g., an interactive web-based programming environment) and cause the algorithm/code to be provided —perhaps as part of a training request (or referenced in a training request)—to the model training system 620, where this algorithm/code may be containerized on its own or used together with an existing container having a machine learning framework, for example.

In some embodiments, instead of providing a container image in the training request, the user device 602 provides, in the training request, an indicator of a container image (e.g., an indication of an address or a location at which a container image is stored). For example, the container image can be stored in a container data store 670, and this container image may have been previously created/uploaded by the user. The model training system 620 can retrieve the container image from the indicated location and create a container using the retrieved container image. The container is then loaded into a virtual machine instance 622 for training a machine learning model, as described in greater detail below.

The model training system 620 can use the information provided by the user device 602 to train a machine learning model in one or more pre-established virtual machine instances 622 in some embodiments. In particular, the model training system 620 includes a single physical computing device or multiple physical computing devices that are interconnected using one or more computing networks (not shown), where the physical computing device(s) host one or more virtual machine instances 622. The model training system 620 can handle the acquisition and configuration of compute capacity (e.g., containers, instances, etc., which are described in greater detail below) based on the information describing the computing machine on which to train a machine learning model provided by the user device 602. The model training system 620 can then train machine learning models using the compute capacity, as is described in greater detail below. The model training system 620 can automatically scale up and down based on the volume of training requests received from user devices 602 via frontend 629, thereby relieving the user from the burden of having to worry about over-utilization (e.g., acquiring too little computing resources and suffering performance issues) or under-utilization (e.g., acquiring more computing resources than necessary to train the machine learning models, and thus overpaying).

In some embodiments, the virtual machine instances 622 are utilized to execute tasks. For example, such tasks can include training a machine learning model. As shown in FIG. 6, each virtual machine instance 622 includes an operating system (OS) 624, a language runtime 626, and one or more ML training containers 630. Generally, the ML training containers 630 are logical units created within a virtual machine instance using the resources available on that instance, and can be utilized to isolate execution of a task from other processes (e.g., task executions) occurring in the instance. In some embodiments, the ML training containers 630 are formed from one or more container images and a top container layer. Each container image may further include one or more image layers, where each image layer represents an executable instruction. As described above, some or all of the executable instructions together represent an algorithm that defines a machine learning model. Changes made to the ML training containers 630 (e.g., creation of new files, modification of existing files, deletion of files, etc.) are stored in the top container layer. If a ML training container 630 is deleted, the top container layer is also deleted. However, the container image(s) that form a portion of the deleted ML training container 630 can remain unchanged. The ML training containers 630 can be implemented, for example, as Linux containers (LXC), Docker containers, and the like.

The ML training containers 630 may include individual a runtime 634, code 636, and dependencies 632 needed by the code 636 in some embodiments. The runtime 634 can be defined by one or more executable instructions that form at least a portion of a container image that is used to form the ML training container 630 (e.g., the executable instruction(s) in the container image that define the operating system and/or runtime to run in the container formed from the container image). The code 636 includes one or more executable instructions that form at least a portion of a container image that is used to form the ML training container 630. For example, the code 636 includes the executable instructions in the container image that represent an algorithm that defines a machine learning model, which may reference (or utilize) code or libraries from dependencies 632. The runtime 634 is configured to execute the code 636 in response to an instruction to begin machine learning model training. Execution of the code 636 results in the generation of model data, as described in greater detail below.

In some embodiments, the code 636 includes executable instructions that represent algorithms that define different machine learning models. For example, the code 636 includes one set of executable instructions that represent a first algorithm that defines a first machine learning model and a second set of executable instructions that represent a second algorithm that defines a second machine learning model. In some embodiments, the virtual machine instance 622 executes the code 636 and trains all of the machine learning models. In some embodiments, the virtual machine instance 622 executes the code 636, selecting one of the machine learning models to train. For example, the virtual machine instance 622 can identify a type of training data indicated by the training request and select a machine learning model to train (e.g., execute the executable instructions that represent an algorithm that defines the selected machine learning model) that corresponds with the identified type of training data.

In some embodiments, the runtime 634 is the same as the runtime 626 utilized by the virtual machine instance 622. In some embodiments, the runtime 634 is different than the runtime 626 utilized by the virtual machine instance 622.

In some embodiments, the model training system 620 uses one or more container images included in a training request (or a container image retrieved from the container data store 670 in response to a received training request) to create and initialize a ML training container 630 in a virtual machine instance 622. For example, the model training system 620 creates a ML training container 630 that includes the container image(s) and/or a top container layer.

Prior to beginning the training process, in some embodiments, the model training system 620 retrieves training data from the location indicated in the training request. For example, the location indicated in the training request can be a location in the training data store 660. Thus, the model training system 620 retrieves the training data from the indicated location in the training data store 660. In some embodiments, the model training system 620 does not retrieve the training data prior to beginning the training process. Rather, the model training system 620 streams the training data from the indicated location during the training process. For example, the model training system 620 can initially retrieve a portion of the training data and provide the retrieved portion to the virtual machine instance 622 training the machine learning model. Once the virtual machine instance 622 has applied and used the retrieved portion or once the virtual machine instance 622 is about to use all of the retrieved portion (e.g., a buffer storing the retrieved portion is nearly empty), then the model training system 620 can retrieve a second portion of the training data and provide the second retrieved portion to the virtual machine instance 622, and so on.

To perform the machine learning model training, the virtual machine instance 622 executes code 636 stored in the ML training container 630 in some embodiments. For example, the code 636 includes some or all of the executable instructions that form the container image of the ML training container 630 initialized therein. Thus, the virtual machine instance 622 executes some or all of the executable instructions that form the container image of the ML training container 630 initialized therein to train a machine learning model. The virtual machine instance 622 executes some or all of the executable instructions according to the hyperparameter values included in the training request. As an illustrative example, the virtual machine instance 622 trains a machine learning model by identifying values for certain parameters (e.g., coefficients, weights, centroids, etc.). The identified values depend on hyperparameters that define how the training is performed. Thus, the virtual machine instance 622 can execute the executable instructions to initiate a machine learning model training process, where the training process is run using the hyperparameter values included in the training request. Execution of the executable instructions can include the virtual machine instance 622 applying the training data retrieved by the model training system 620 as input parameters to some or all of the instructions being executed.

In some embodiments, executing the executable instructions causes the virtual machine instance 622 (e.g., the ML training container 630) to generate model data. For example, the ML training container 630 generates model data and stores the model data in a file system of the ML training container 630. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 630 such that the model data is written to the top container layer of the ML training container 630 and/or the container image(s) that forms a portion of the ML training container 630 is modified to include the model data.

The virtual machine instance 622 (or the model training system 620 itself) pulls the generated model data from the ML training container 630 and stores the generated model data in the training model data store 675 in an entry associated with the virtual machine instance 622 and/or the machine learning model being trained. In some embodiments, the virtual machine instance 622 generates a single file that includes model data and stores the single file in the training model data store 675. In some embodiments, the virtual machine instance 622 generates multiple files during the course of training a machine learning model, where each file includes model data. In some embodiments, each model data file includes the same or different model data information (e.g., one file identifies the structure of an algorithm, another file includes a list of coefficients, etc.). The virtual machine instance 622 can package the multiple files into a single file once training is complete and store the single file in the training model data store 675. Alternatively, the virtual machine instance 622 stores the multiple files in the training model data store 675. The virtual machine instance 622 stores the file(s) in the training model data store 675 while the training process is ongoing and/or after the training process is complete.

In some embodiments, the virtual machine instance 622 regularly stores model data file(s) in the training model data store 675 as the training process is ongoing. Thus, model data file(s) can be stored in the training model data store 675 at different times during the training process. Each set of model data files corresponding to a particular time or each set of model data files present in the training model data store 675 as of a particular time could be checkpoints that represent different versions of a partially-trained machine learning model during different stages of the training process. Accordingly, before training is complete, a user, via the user device 602 can submit a deployment and/or execution request in a manner as described below to deploy and/or execute a version of a partially trained machine learning model (e.g., a machine learning model trained as of a certain stage in the training process). A version of a partially-trained machine learning model can be based on some or all of the model data files stored in the training model data store 675.

In some embodiments, a virtual machine instance 622 executes code 636 stored in a plurality of ML training containers 630. For example, the algorithm included in the container image can be in a format that allows for the parallelization of the training process. Thus, the model training system 620 can create multiple copies of the container image provided in a training request and cause the virtual machine instance 622 to load each container image copy in a separate ML training container 630. The virtual machine instance 622 can then execute, in parallel, the code 636 stored in the ML training containers 630. The virtual machine instance 622 can further provide configuration information to each ML training container 630 (e.g., information indicating that N ML training containers 630 are collectively training a machine learning model and that a particular ML training container 630 receiving the configuration information is ML training container 630 number X of N), which can be included in the resulting model data. By parallelizing the training process, the model training system 620 can significantly reduce the training time in some embodiments.

In some embodiments, a plurality of virtual machine instances 622 execute code 636 stored in a plurality of ML training containers 630. For example, the resources used to train a particular machine learning model can exceed the limitations of a single virtual machine instance 622. However, the algorithm included in the container image can be in a format that allows for the parallelization of the training process. Thus, the model training system 620 can create multiple copies of the container image provided in a training request, initialize multiple virtual machine instances 622, and cause each virtual machine instance 622 to load a container image copy in one or more separate ML training containers 630. The virtual machine instances 622 can then each execute the code 636 stored in the ML training containers 630 in parallel. The model training system 620 can further provide configuration information to each ML training container 630 via the virtual machine instances 622 (e.g., information indicating that N ML training containers 630 are collectively training a machine learning model and that a particular ML training container 630 receiving the configuration information is ML training container 630 number X of N, information indicating that M virtual machine instances 622 are collectively training a machine learning model and that a particular ML training container 630 receiving the configuration information is initialized in virtual machine instance 622 number Y of M, etc.), which can be included in the resulting model data. As described above, by parallelizing the training process, the model training system 620 can significantly reduce the training time in some embodiments.

In some embodiments, the model training system 620 includes a plurality of physical computing devices and two or more of the physical computing devices hosts one or more virtual machine instances 622 that execute the code 636. Thus, the parallelization can occur over different physical computing devices in addition to over different virtual machine instances 622 and/or ML training containers 630.

In some embodiments, the model training system 620 includes a ML model evaluator 628. The ML model evaluator 628 can monitor virtual machine instances 622 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (e.g., a level of confidence that the accuracy of the machine learning model being trained is known, etc. The ML model evaluator 628 can obtain the model data for a machine learning model being trained and evaluation data from the training data store 660. The evaluation data is separate from the data used to train a machine learning model and includes both input data and expected outputs (e.g., known results), and thus the ML model evaluator 628 can define a machine learning model using the model data and execute the machine learning model by providing the input data as inputs to the machine learning model. The ML model evaluator 628 can then compare the outputs of the machine learning model to the expected outputs, and determine one or more quality metrics of the machine learning model being trained based on the comparison (e.g., the error rate can be a difference or distance between the machine learning model outputs and the expected outputs).

The ML model evaluator 628 periodically generates model metrics during the training process and stores the model metrics in the training metrics data store 665 in some embodiments. While the machine learning model is being trained, a user, via the user device 602, can access and retrieve the model metrics from the training metrics data store 665. The user can then use the model metrics to determine whether to adjust the training process and/or to stop the training process. For example, the model metrics can indicate that the machine learning model is performing poorly (e.g., has an error rate above a threshold value, has a statistical distribution that is not an expected or desired distribution (e.g., not a binomial distribution, a Poisson distribution, a geometric distribution, a normal distribution, Gaussian distribution, etc.), has an execution latency above a threshold value, has a confidence level below a threshold value)) and/or is performing progressively worse (e.g., the quality metric continues to worsen over time). In response, in some embodiments, the user, via the user device 602, can transmit a request to the model training system 620 to modify the machine learning model being trained (e.g., transmit a modification request). The request can include a new or modified container image, a new or modified algorithm, new or modified hyperparameter(s), and/or new or modified information describing the computing machine on which to train a machine learning model. The model training system 620 can modify the machine learning model accordingly. For example, the model training system 620 can cause the virtual machine instance 622 to optionally delete an existing ML training container 630, create and initialize a new ML training container 630 using some or all of the information included in the request, and execute the code 636 stored in the new ML training container 630 to restart the machine learning model training process. As another example, the model training system 620 can cause the virtual machine instance 622 to modify the execution of code stored in an existing ML training container 630 according to the data provided in the modification request. In some embodiments, the user, via the user device 602, can transmit a request to the model training system 620 to stop the machine learning model training process. The model training system 620 can then instruct the virtual machine instance 622 to delete the ML training container 630 and/or to delete any model data stored in the training model data store 675.

As described below, in some embodiments, the model data stored in the training model data store 675 is used by the model hosting system 640 to deploy machine learning models. Alternatively or in addition, a user device 602 or another computing device (not shown) can retrieve the model data from the training model data store 675 to implement a learning algorithm in an external device. As an illustrative example, a robotic device can include sensors to capture input data. A user device 602 can retrieve the model data from the training model data store 675 and store the model data in the robotic device. The model data defines a machine learning model. Thus, the robotic device can provide the captured input data as an input to the machine learning model, resulting in an output. The robotic device can then perform an action (e.g., move forward, raise an arm, generate a sound, etc.) based on the resulting output.

While the virtual machine instances 622 are shown in FIG. 6 as a single grouping of virtual machine instances 622, some embodiments of the present application separate virtual machine instances 622 that are actively assigned to execute tasks from those virtual machine instances 622 that are not actively assigned to execute tasks. For example, those virtual machine instances 622 actively assigned to execute tasks are grouped into an "active pool," while those virtual machine instances 622 not actively assigned to execute tasks are placed within a "warming pool." In some embodiments, those virtual machine instances 622 within the warming pool can be pre-initialized with an operating system, language runtimes, and/or other software required to enable rapid execution of tasks (e.g., rapid initialization of machine learning model training in ML training container(s) 630) in response to training requests.

In some embodiments, the model training system 620 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (e.g., user devices 602, the model hosting system 640, etc.). The processing unit can also communicate to and from a memory of a virtual machine instance 622 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 640 includes a single physical computing device or multiple physical computing devices that are interconnected using one or more computing networks (not shown), where the physical computing device(s) host one or more virtual machine instances 642. The model hosting system 640 can handle the acquisition and configuration of compute capacity (e.g., containers, instances, etc.) based on demand for the execution of trained machine learning models. The model hosting system 640 can then execute machine learning models using the compute capacity, as is described in greater detail below. The model hosting system 640 can automatically scale up and down based on the volume of execution requests received from user devices 602 via frontend 649 of the model hosting system 640, thereby relieving the user from the burden of having to worry about over-utilization (e.g., acquiring too little computing resources and suffering performance issues) or under-utilization (e.g., acquiring more computing resources than necessary to run the machine learning models, and thus overpaying).

In some embodiments, the virtual machine instances 642 are utilized to execute tasks. For example, such tasks can include executing a machine learning model. As shown in FIG. 6, each virtual machine instance 642 includes an operating system (OS) 644, a language runtime 646, and one or more ML scoring containers 650. The ML scoring containers 650 are similar to the ML training containers 630 in that the ML scoring containers 650 are logical units created within a virtual machine instance using the resources available on that instance, and can be utilized to isolate execution of a task from other processes (e.g., task executions) occurring in the instance. In some embodiments, the ML scoring containers 650 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 650 (e.g., creation of new files, modification of existing files, deletion of files, etc.) are stored in the top container layer. If a ML scoring container 650 is deleted, the top container layer is also deleted. However, the container image(s) that form a portion of the deleted ML scoring container 650 can remain unchanged. The ML scoring containers 650 can be implemented, for example, as Linux containers.

The ML scoring containers 650 each include a runtime 654, code 656, and dependencies 652 (e.g., supporting software such as libraries) needed by the code 656 in some embodiments. The runtime 654 can be defined by one or more executable instructions that form at least a portion of a container image that is used to form the ML scoring container 650 (e.g., the executable instruction(s) in the container image that define the operating system and/or runtime to run in the container formed from the container image). The code 656 includes one or more executable instructions that form at least a portion of a container image that is used to form the ML scoring container 650. For example, the code 656 includes the executable instructions in the container image that represent an algorithm that defines a machine learning model, which may reference dependencies 652. The code 656 can also include model data that represent characteristics of the defined machine learning model, as described in greater detail below. The runtime 654 is configured to execute the code 656 in response to an instruction to begin execution of a machine learning model. Execution of the code 656 results in the generation of outputs (e.g., predicted results), as described in greater detail below.

In some embodiments, the runtime 654 is the same as the runtime 646 utilized by the virtual machine instance 642. In some embodiments, runtime 654 is different than the runtime 646 utilized by the virtual machine instance 642.

In some embodiments, the model hosting system 640 uses one or more container images included in a deployment request (or a container image retrieved from the container data store 670 in response to a received deployment request) to create and initialize a ML scoring container 650 in a virtual machine instance 642. For example, the model hosting system 640 creates a ML scoring container 650 that includes the container image(s) and/or a top container layer.

As described above, a user device 602 can submit a deployment request and/or an execution request to the model hosting system 640 via the frontend 649 in some embodiments. A deployment request causes the model hosting system 640 to deploy a trained machine learning model into a virtual machine instance 642. For example, the deployment request can include an identification of an endpoint (e.g., an endpoint name, such as an HTTP endpoint name) and an identification of one or more trained machine learning models (e.g., a location of one or more model data files stored in the training model data store 675). Optionally, the deployment request also includes an identification of one or more container images stored in the container data store 670.

Upon receiving the deployment request, the model hosting system 640 initializes ones or more ML scoring containers 650 in one or more hosted virtual machine instance 642. In embodiments in which the deployment request includes an identification of one or more container images, the model hosting system 640 forms the ML scoring container(s) 650 from the identified container image(s). For example, a container image identified in a deployment request can be the same container image used to form an ML training container 630 used to train the machine learning model corresponding to the deployment request. Thus, the code 656 of the ML scoring container(s) 650 includes one or more executable instructions in the container image(s) that represent an algorithm that defines a machine learning model. In embodiments in which the deployment request does not include an identification of a container image, the model hosting system 640 forms the ML scoring container(s) 650 from one or more container images stored in the container data store 670 that are appropriate for executing the identified trained machine learning model(s). For example, an appropriate container image can be a container image that includes executable instructions that represent an algorithm that defines the identified trained machine learning model(s).

The model hosting system 640 further forms the ML scoring container(s) 650 by retrieving model data corresponding to the identified trained machine learning model(s) in some embodiments. For example, the deployment request can identify a location of model data file(s) stored in the training model data store 675. In embodiments in which a single model data file is identified in the deployment request, the model hosting system 640 retrieves the identified model data file from the training model data store 675 and inserts the model data file into a single ML scoring container 650, which forms a portion of code 656. In some embodiments, the model data file is archived or compressed (e.g., formed from a package of individual files). Thus, the model hosting system 640 unarchives or decompresses the model data file to obtain multiple individual files, and inserts the individual files into the ML scoring container 650. In some embodiments, the model hosting system 640 stores the model data file in the same location as the location in which the model data file was stored in the ML training container 630 that generated the model data file. For example, the model data file initially was stored in the top container layer of the ML training container 630 at a certain offset, and the model hosting system 640 then stores the model data file in the top container layer of the ML scoring container 650 at the same offset.

In embodiments in which multiple model data files are identified in the deployment request, the model hosting system 640 retrieves the identified model data files from the training model data store 675. The model hosting system 640 can insert the model data files into the same ML scoring container 650, into different ML scoring containers 650 initialized in the same virtual machine instance 642, or into different ML scoring containers 650 initialized in different virtual machine instances 642. As an illustrative example, the deployment request can identify multiple model data files corresponding to different trained machine learning models because the trained machine learning models are related (e.g., the output of one trained machine learning model is used as an input to another trained machine learning model). Thus, the user may desire to deploy multiple machine learning models to eventually receive a single output that relies on the outputs of multiple machine learning models.

In some embodiments, the model hosting system 640 associates the initialized ML scoring container(s) 650 with the endpoint identified in the deployment request. For example, each of the initialized ML scoring container(s) 650 can be associated with a network address. The model hosting system 640 can map the network address(es) to the identified endpoint, and the model hosting system 640 or another system (e.g., a routing system, not shown) can store the mapping. Thus, a user device 602 can refer to trained machine learning model(s) stored in the ML scoring container(s) 650 using the endpoint. This allows for the network address of an ML scoring container 650 to change without causing the user operating the user device 602 to change the way in which the user refers to a trained machine learning model.

Once the ML scoring container(s) 650 are initialized, the ML scoring container(s) 650 are ready to execute trained machine learning model(s). In some embodiments, the user device 602 transmits an execution request to the model hosting system 640 via the frontend 649, where the execution request identifies an endpoint and includes an input to a machine learning model (e.g., a set of input data). The model hosting system 640 or another system (e.g., a routing system, not shown) can obtain the execution request, identify the ML scoring container(s) 650 corresponding to the identified endpoint, and route the input to the identified ML scoring container(s) 650.

In some embodiments, a virtual machine instance 642 executes the code 656 stored in an identified ML scoring container 650 in response to the model hosting system 640 receiving the execution request. In particular, execution of the code 656 causes the executable instructions in the code 656 corresponding to the algorithm to read the model data file stored in the ML scoring container 650, use the input included in the execution request as an input parameter, and generate a corresponding output. As an illustrative example, the algorithm can include coefficients, weights, layers, cluster centroids, and/or the like. The executable instructions in the code 656 corresponding to the algorithm can read the model data file to determine values for the coefficients, weights, layers, cluster centroids, and/or the like. The executable instructions can include input parameters, and the input included in the execution request can be supplied by the virtual machine instance 642 as the input parameters. With the machine learning model characteristics and the input parameters provided, execution of the executable instructions by the virtual machine instance 642 can be completed, resulting in an output.

In some embodiments, the virtual machine instance 642 stores the output in the model prediction data store 680. Alternatively or in addition, the virtual machine instance 642 transmits the output to the user device 602 that submitted the execution result via the frontend 649.

In some embodiments, the execution request corresponds to a group of related trained machine learning models. Thus, the ML scoring container 650 can transmit the output to a second ML scoring container 650 initialized in the same virtual machine instance 642 or in a different virtual machine instance 642. The virtual machine instance 642 that initialized the second ML scoring container 650 can then execute second code 656 stored in the second ML scoring container 650, providing the received output as an input parameter to the executable instructions in the second code 656. The second ML scoring container 650 further includes a model data file stored therein, which is read by the executable instructions in the second code 656 to determine values for the characteristics defining the machine learning model. Execution of the second code 656 results in a second output. The virtual machine instance 642 that initialized the second ML scoring container 650 can then transmit the second output to the model prediction data store 680 and/or the user device 602 via the frontend 649 (e.g., if no more trained machine learning models are needed to generate an output) or transmit the second output to a third ML scoring container 650 initialized in the same or different virtual machine instance 642 (e.g., if outputs from one or more additional trained machine learning models are needed), and the above-referenced process can be repeated with respect to the third ML scoring container 650.

While the virtual machine instances 642 are shown in FIG. 6 as a single grouping of virtual machine instances 642, some embodiments of the present application separate virtual machine instances 642 that are actively assigned to execute tasks from those virtual machine instances 642 that are not actively assigned to execute tasks. For example, those virtual machine instances 642 actively assigned to execute tasks are grouped into an "active pool," while those virtual machine instances 642 not actively assigned to execute tasks are placed within a "warming pool." In some embodiments, those virtual machine instances 642 within the warming pool can be pre-initialized with an operating system, language runtimes, and/or other software required to enable rapid execution of tasks (e.g., rapid initialization of ML scoring container(s) 650, rapid execution of code 656 in ML scoring container(s), etc.) in response to deployment and/or execution requests.

In some embodiments, the model hosting system 640 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (e.g., user devices 602, the model training system 620, etc.). The processing unit can also communicate to and from a memory of a virtual machine instance 642 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment supports many different types of machine learning models, such as multi arm bandit models, reinforcement learning models, ensemble machine learning models, deep learning models, and/or the like.

The model training system 620 and the model hosting system 640 depicted in FIG. 6 are not meant to be limiting. For example, the model training system 620 and/or the model hosting system 640 could also operate within a computing environment having a fewer or greater number of devices than are illustrated in FIG. 6. Thus, the depiction of the model training system 620 and/or the model hosting system 640 in FIG. 6 may be taken as illustrative and not limiting to the present disclosure. For example, the model training system 620 and/or the model hosting system 640 or various constituents thereof could implement various Web services components, hosted or "cloud" computing environments, and/or peer-to-peer network configurations to implement at least a portion of the processes described herein. In some embodiments, the model training system 620 and/or the model hosting system 640 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend 629 processes all training requests received from user devices 602 and provisions virtual machine instances 622. In some embodiments, the frontend 629 serves as a front door to all the other services provided by the model training system 620. The frontend 629 processes the requests and makes sure that the requests are properly authorized. For example, the frontend 629 may determine whether the user associated with the training request is authorized to initiate the training process.

Similarly, frontend 649 processes all deployment and execution requests received from user devices 602 and provisions virtual machine instances 642. In some embodiments, the frontend 649 serves as a front door to all the other services provided by the model hosting system 640. The frontend 649 processes the requests and makes sure that the requests are properly authorized. For example, the frontend 649 may determine whether the user associated with a deployment request or an execution request is authorized to access the indicated model data and/or to execute the indicated machine learning model.

The training data store 660 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 660 is depicted as being located external to the model training system 620 and the model hosting system 640, this is not meant to be limiting. For example, in some embodiments not shown, the training data store 660 is located internal to at least one of the model training system 620 or the model hosting system 640.

In some embodiments, the training metrics data store 665 stores model metrics. While the training metrics data store 665 is depicted as being located external to the model training system 620 and the model hosting system 640, this is not meant to be limiting. For example, in some embodiments not shown, the training metrics data store 665 is located internal to at least one of the model training system 620 or the model hosting system 640.

The container data store 670 stores container images, such as container images used to form ML training containers 630 and/or ML scoring containers 650, that can be retrieved by various virtual machine instances 622 and/or 642. While the container data store 670 is depicted as being located external to the model training system 620 and the model hosting system 640, this is not meant to be limiting. For example, in some embodiments not shown, the container data store 670 is located internal to at least one of the model training system 620 and the model hosting system 640.

The training model data store 675 stores model data files. In some embodiments, some of the model data files are comprised of a single file, while other model data files are packages of multiple individual files. While the training model data store 675 is depicted as being located external to the model training system 620 and the model hosting system 640, this is not meant to be limiting. For example, in some embodiments not shown, the training model data store 675 is located internal to at least one of the model training system 620 or the model hosting system 640.

The model prediction data store 680 stores outputs (e.g., execution results) generated by the ML scoring containers 650 in some embodiments. While the model prediction data store 680 is depicted as being located external to the model training system 620 and the model hosting system 640, this is not meant to be limiting. For example, in some embodiments not shown, the model prediction data store 680 is located internal to at least one of the model training system 620 and the model hosting system 640.

While the model training system 620, the model hosting system 640, the training data store 660, the training metrics data store 665, the container data store 670, the training model data store 675, and the model prediction data store 680 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (e.g., also referred to herein as a machine learning service) can communicate with one or more of the user devices 602 via the network 610.

Various example user devices 602 are shown in FIG. 6, including a desktop computer, laptop, and a mobile phone, each provided by way of illustration. In general, the user devices 602 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, the model training system 620 and/or the model hosting system 640 provides the user devices 602 with one or more user interfaces, command-line interfaces (CLI), application programming interfaces (API), and/or other programmatic interfaces for submitting training requests, deployment requests, and/or execution requests. In some embodiments, the user devices 602 can execute a stand-alone application that interacts with the model training system 620 and/or the model hosting system 640 for submitting training requests, deployment requests, and/or execution requests.

In some embodiments, the network 610 includes any wired network, wireless network, or combination thereof. For example, the network 610 may be a personal area network, local area network, wide area network, over-the-air broadcast network (e.g., for radio or television), cable network, satellite network, cellular telephone network, or combination thereof. As a further example, the network 610 may be a publicly accessible network of linked networks, possibly operated by various distinct parties, such as the Internet. In some embodiments, the network 610 may be a private or semi-private network, such as a corporate or university intranet. The network 610 may include one or more wireless networks, such as a Global System for Mobile Communications (GSM) network, a Code Division Multiple Access (CDMA) network, a Long Term Evolution (LTE) network, or any other type of wireless network. The network 610 can use protocols and components for communicating via the Internet or any of the other aforementioned types of networks. For example, the protocols used by the network 610 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 7:
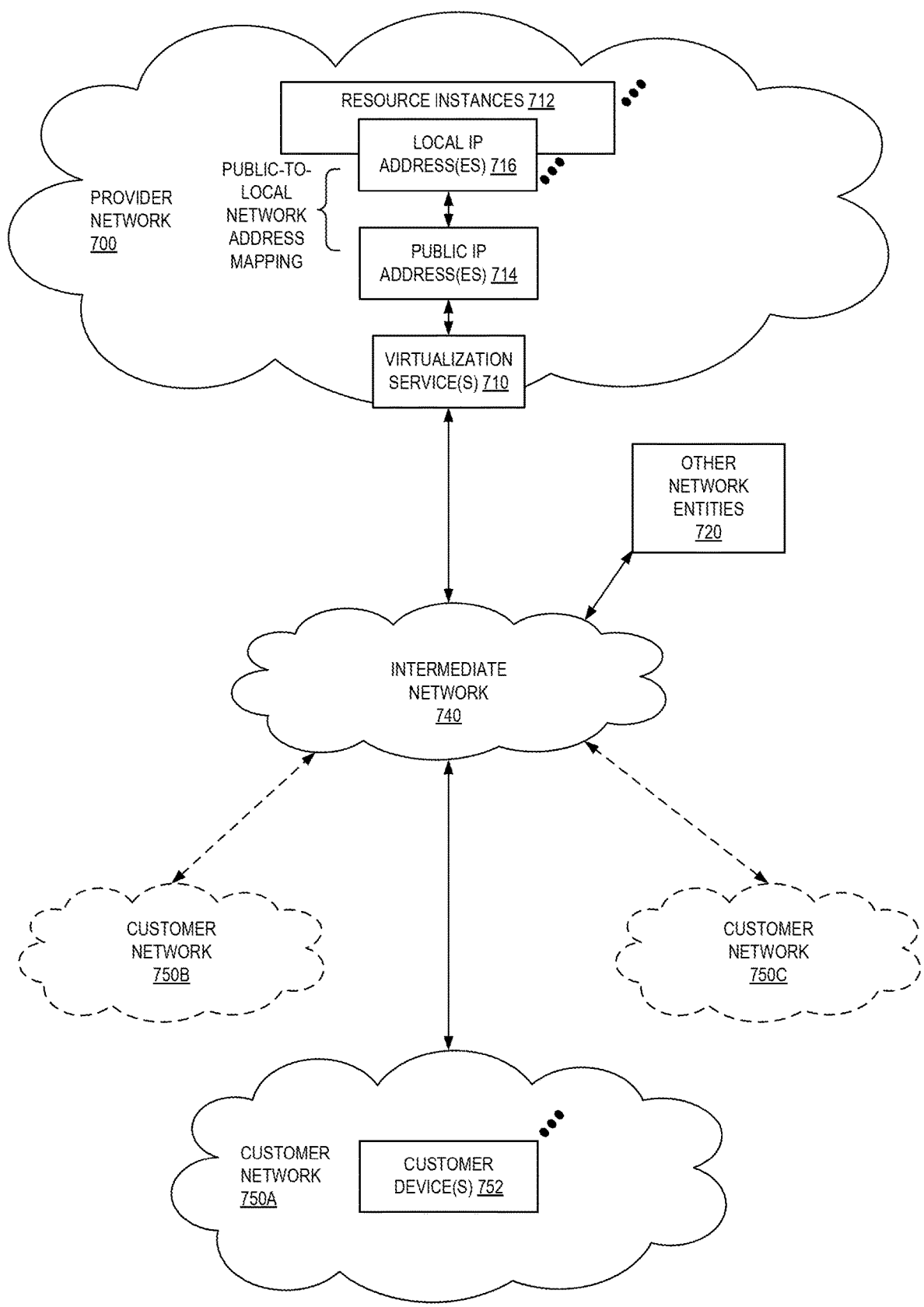
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local IP addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses maybe assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Illustrative System

Figure 8:
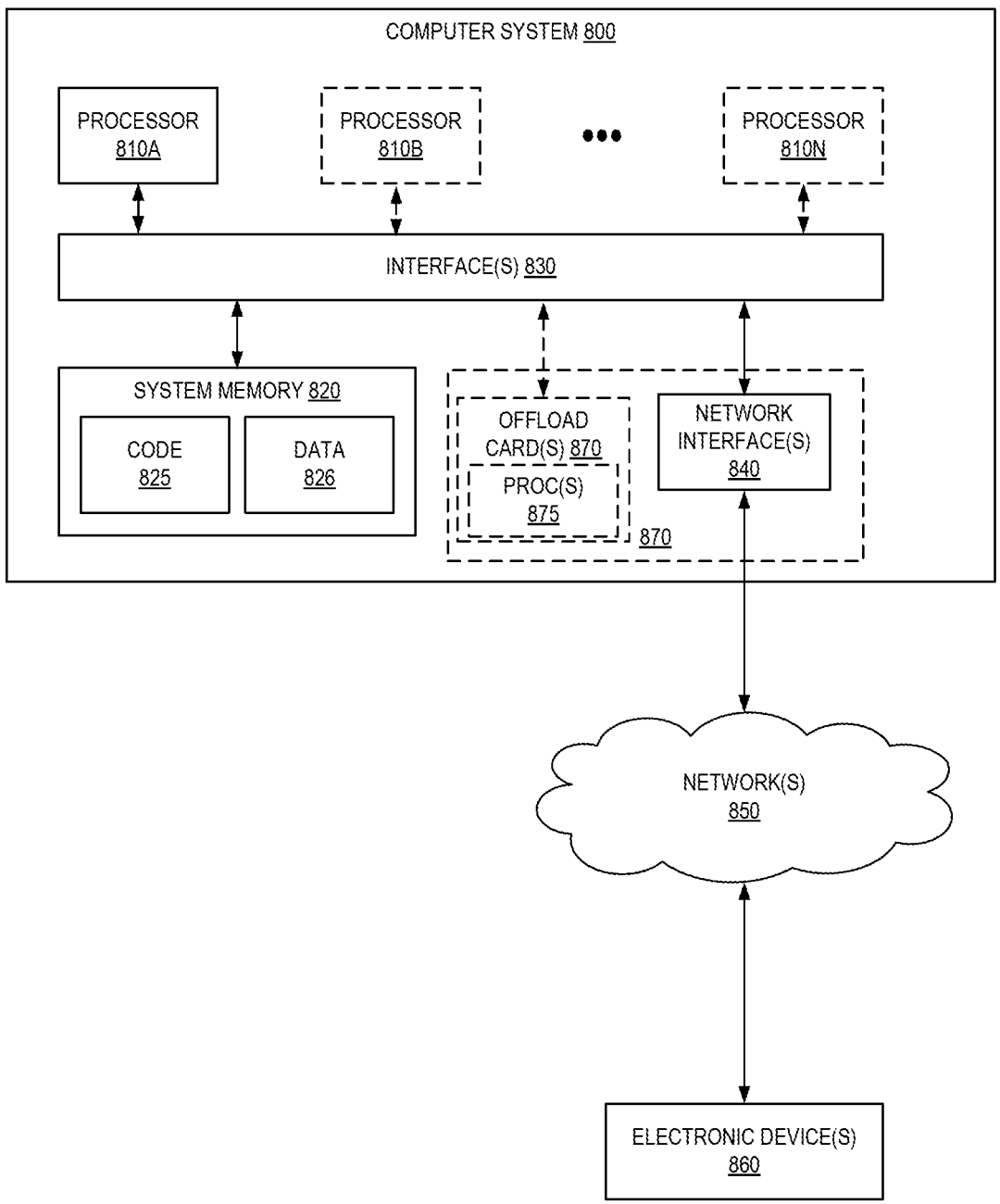
FIG. 8 is a block diagram illustrating an example computer system that may be used in some embodiments.

In some embodiments, a system that implements a portion or all of the techniques for intelligent task-oriented multi-turn dialog system implementation described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 820 as code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Figure 9:
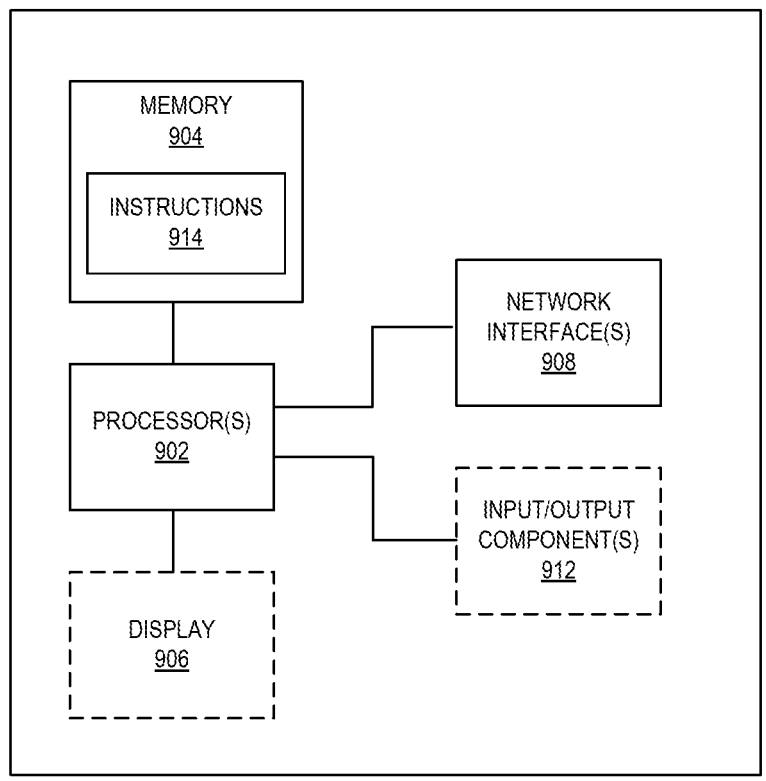
FIG. 9 illustrates a logical arrangement of a set of general components of an exemplary computing device that can be utilized in accordance with various embodiments.

FIG. 9 illustrates a logical arrangement of a set of general components of an example computing device 900 such as electronic device(s) 106A-106C, etc. Generally, a computing device 900 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 902 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 904) to store code (e.g., instructions 914) and/or data, and a set of one or more wired or wireless network interfaces 908 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 904) of a given electronic device typically stores code (e.g., instructions 914) for execution on the set of one or more processors 902 of that electronic device. One or more parts of various embodiments may be implemented using different combinations of software, firmware, and/or hardware.

A computing device 900 can include some type of display element 906, such as a touch screen or liquid crystal display (LCD), although many devices such as portable media players might convey information via other means, such as through audio speakers, and other types of devices such as server end stations may not have a display element 906 at all. As discussed, some computing devices used in some embodiments include at least one input and/or output component(s) 912 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 10:
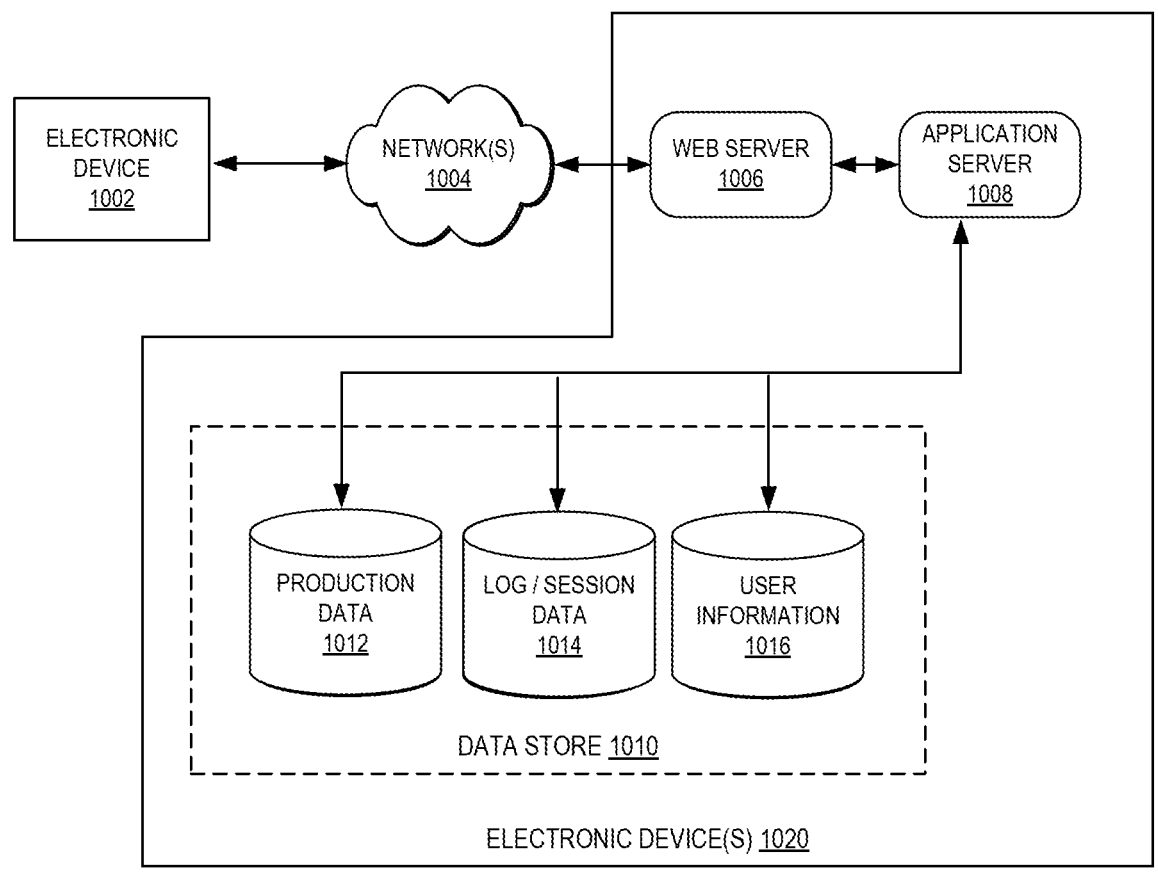
FIG. 10 illustrates an example of an environment for implementing aspects in accordance with various embodiments.

As discussed, different approaches can be implemented in various environments in accordance with the described embodiments. For example, FIG. 10 illustrates an example of an environment 1000 for implementing aspects in accordance with various embodiments. For example, in some embodiments, messages can be HyperText Transfer Protocol (HTTP) requests that are received by a web server (e.g., web server 1006), and the users, via electronic devices, may interact with the provider network via a web portal provided via the web server 1006 and application server 1008. As will be appreciated, although a web-based environment is used for purposes of explanation, different environments may be used, as appropriate, to implement various embodiments. The system includes an electronic client device 1002, which may also be referred to as a client device and can be any appropriate device operable to send and receive requests, messages or information over an appropriate network 1004 and convey information back to a user of the device 1002. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1004 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1004 includes the Internet, as the environment includes a web server 1006 for receiving requests and serving content in response thereto, although for other networks an alternative device serving a similar purpose could be used, as would be apparent to one of ordinary skill in the art.

The illustrative environment includes at least one application server 1008 and a data store 1010. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device 1002 and handling a majority of the data access and business logic for an application. The application server 1008 provides access control services in cooperation with the data store 1010 and is able to generate content such as text, graphics, audio, video, etc., to be transferred to the client device 1002, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1002 and the application server 1008, can be handled by the web server 1006. It should be understood that the web server 1006 and application server 1008 are not required and are merely example components, as structured code discussed herein can be executed on any appropriate device or host machine as discussed elsewhere herein.

The data store 1010 can include several separate data tables, databases, or other data storage mechanisms and media for storing data relating to a particular aspect. For example, the data store illustrated includes mechanisms for storing production data 1012 and user information 1016, which can be used to serve content for the production side. The data store 1010 also is shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update, or otherwise process data in response thereto. In one example, a user might submit a search request for a certain type of item. In this case, the data store 1010 might access the user information 1016 to verify the identity of the user and can access a production data 1012 to obtain information about items of that type. The information can then be returned to the user, such as in a listing of results on a web page that the user is able to view via a browser on the user device 1002. Information for a particular item of interest can be viewed in a dedicated page or window of the browser.

The web server 1006, application server 1008, and/or data store 1010 may be implemented by one or more electronic devices 1020, which can also be referred to as electronic server devices or server end stations, and may or may not be located in different geographic locations. Each of the one or more electronic devices 1020 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the environment 1000 in FIG. 10 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 106A-106C) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    receiving a chat message provided by a user within a multi-turn chat dialog between the user and an agent;
    inputting at least the chat message or a representation of the chat message to a sequence-to-sequence (seq2seq) machine learning (ML) model, wherein the seq2seq ML model was retrained using a reward function that is based at least in part on a distance between a predicted response value and a goal value in a latent space, wherein the seq2seq ML model is at least partially based on an encoder-decoder architecture and comprises at least an encoder and at least a decoder, and wherein the goal value for each training sample used to train the seq2seq ML model is based at least in part on an output of the encoder and the decoder at a final turn of a training chat dialog that the training sample is from;
    obtaining a vector of a plurality of values generated by the seq2seq ML model, the plurality of values including a first embedding from a current turn of the chat dialog and a second embedding from a previous turn of the chat dialog;
    selecting one or more candidate responses to the chat message based on the obtained vector, the selecting comprising:
        performing a nearest neighbor search using the obtained vector to identify one or more other vectors, the one or more other vectors corresponding to one or more chat messages from one or more other chat dialogs; and
        selecting, as the one or more candidate responses, the one or more chat messages; and providing the one or more candidate responses to the user or the agent.

2. The computer-implemented method of claim 1, wherein providing the one or more candidate responses to the user or the agent comprises:
   transmitting the one or more candidate responses to an agent system to be presented to the agent via a graphical user interface (GUI).

3. The method of claim 1, wherein the first embedding comprises an output of the encoder of the current turn of the chat dialog, and wherein the second embedding comprises an output of the decoder from the previous turn of the chat dialog.

4. A computer-implemented method comprising:
   receiving a message from a user at an endpoint of a web-based service, wherein the message is part of a multi-turn chat dialog between the user and an agent;
   providing data based on the message to a machine learning (ML) model to generate a first embedding, the ML model comprising at least an encoder and a decoder, wherein the ML model was retrained using a loss function based at least in part on a distance between a predicted response value and a goal value in a latent space, wherein the goal value for each training sample used to train the ML model is based at least in part on an output of the encoder or an output of the decoder at a final turn of a training chat dialog that the training sample is from;
   selecting one or more responses to the message, the selecting comprising:
      obtaining a vector of a plurality of values including the first embedding and also a second embedding generated by the ML model during a previous turn of the chat dialog,
      identifying one or more other vectors based on a nearest neighbor search using the vector, and
      selecting, as the one or more responses, one or more chat messages corresponding to the identified one or more other vectors; and
   providing, by the web-based service, the one or more responses to the user or to an agent.

5. The computer-implemented method of claim 4, wherein the one or more responses are or are based on responses from one or more other chat dialogs.

6. The computer-implemented method of claim 4, wherein selecting the one or more chat messages comprises selecting a plurality of agent chat messages as the one or more responses.

7. The computer-implemented method of claim 4, wherein providing the one or more responses comprises:
   sending the one or more responses to an agent system to be presented via a graphical user interface (GUI) to the agent, wherein the one or more responses are selectable by the agent to indicate a response to be sent to an electronic device of the user that provided the message as part of the chat dialog.

8. The computer-implemented method of claim 7, wherein the selected one or more responses comprise a plurality of responses that are presented via the GUI to the agent, wherein the GUI allows the agent to select one of the plurality of responses to be provided to the user as a response to the message.

9. The computer-implemented method of claim 4, further comprising:
   causing one of the selected one or more responses to be sent to an electronic device of the user that provided the message.

10. The computer-implemented method of claim 4, wherein the ML model comprises an initial sequence to sequence (seq2seq) ML model that was re-trained to maximize a weighted sum of a negative cross entropy and a negative distance to a final goal.

11. The computer-implemented method of claim 4, wherein:
   the message is an alphanumeric message or an audio message;
   the message is a second or later message made by the user within the multi-turn chat dialog; and
   the one or more responses are selected based at least in part on two or more of the message, a previous message made by the user within the multi-turn dialog, or a previous response made by the agent in the multi-turn dialog.

12. The method of claim 4, wherein the first embedding comprises an output of the encoder of a current turn of the chat dialog, and wherein the second embedding comprises an output of the decoder from the previous turn of the chat dialog.

13. A system comprising:
   an agent system implemented by a first one or more electronic devices to engage in an agent-user chat dialog; and
   a chatbot system implemented by a second one or more electronic devices, the chatbot system including instructions that upon execution cause the chatbot system to:
      receive a representation of a chat message provided by a user as part of the agent-user chat dialog;
      generate a first embedding using at least the representation of the chat message and a machine learning (ML) model, wherein the ML model was retrained using a reward function that is based at least in part on a distance between a predicted response value and a goal value in a latent space, wherein the ML model comprises at least an encoder and at least a decoder, and wherein the goal value for each training sample used to train the ML model is based at least in part on an output of the encoder or an output of the decoder at a final turn of a training chat dialog that the training sample is from; and
      select one or more candidate responses to the chat message to be provided to the agent system as one or more recommendations for an agent response to the chat message within the agent-user chat dialog, wherein to select the one or more candidate responses the chatbot system is to:
         obtain a vector of a plurality of values including the first embedding and also a second embedding generated by the ML model during a previous turn of the chat dialog,
         identify one or more other vectors based on a nearest neighbor search using the vector, and
         select, as the one or more candidate responses, one or more chat messages corresponding to the identified one or more other vectors.

14. The system of claim 13, wherein the one or more candidate responses are from one or more other chat dialogs.

15. The system of claim 14, wherein the one or more other chat dialogs were used to train the ML model.

16. The system of claim 13, wherein the ML model comprises an initial ML model that was re-trained to maximize a weighted sum of a negative cross entropy and a negative distance to a goal.

17. The system of claim 13, wherein the reward function is further based on cross entropy.

18. The system of claim 13, wherein the first embedding comprises an output of the encoder of a current turn of the chat dialog, and wherein the second embedding comprises an output of the decoder from the previous turn of the chat dialog.

\* \* \* \* \*